(12) United States Patent
Katayama et al.

(10) Patent No.: US 9,023,960 B2
(45) Date of Patent: May 5, 2015

(54) PROCESS FOR PRODUCING α-OLEFIN POLYMER, α-OLEFIN POLYMER, AND LUBRICATING OIL COMPOSITION

(75) Inventors: Kiyokazu Katayama, Chiba (JP); Hideaki Noda, Chiba (JP); Hitomi Shimizu, Chiba (JP); Kiyohiko Yokota, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 226 days.

(21) Appl. No.: 13/142,326

(22) PCT Filed: Dec. 25, 2009

(86) PCT No.: PCT/JP2009/071598
§ 371 (c)(1),
(2), (4) Date: Aug. 25, 2011

(87) PCT Pub. No.: WO2010/074233
PCT Pub. Date: Jul. 1, 2010

(65) Prior Publication Data
US 2012/0040878 A1   Feb. 16, 2012

(30) Foreign Application Priority Data
Dec. 26, 2008   (JP) ................ 2008-334833

(51) Int. Cl.
| | | |
|---|---|---|
| *C08F 4/642* | (2006.01) | |
| *C08F 4/643* | (2006.01) | |
| *C08F 4/6592* | (2006.01) | |
| *C08F 10/14* | (2006.01) | |
| *C08F 210/14* | (2006.01) | |
| *C08F 8/04* | (2006.01) | |
| *C08F 10/00* | (2006.01) | |
| *C10M 107/10* | (2006.01) | |
| *C10M 143/08* | (2006.01) | |
| *C08F 4/659* | (2006.01) | |
| *C08F 110/02* | (2006.01) | |
| *C08F 210/16* | (2006.01) | |

(52) U.S. Cl.
CPC ............ *C08F 8/04* (2013.01); *C08F 4/65912* (2013.01); *C08F 10/00* (2013.01); *C08F 110/02* (2013.01); *C08F 210/16* (2013.01); *C10M 107/10* (2013.01); *C10M 143/08* (2013.01); *C10M 2205/028* (2013.01); *C10M 2205/0285* (2013.01); *C10N 2220/021* (2013.01); *C10N 2220/022* (2013.01); *C10N 2220/023* (2013.01); *C10N 2230/54* (2013.01); *C10N 2240/04* (2013.01); *C10N 2240/042* (2013.01); *C10N 2240/06* (2013.01); *C10N 2240/08* (2013.01); *C10N 2240/10* (2013.01); *C10N 2240/101* (2013.01); *C10N 2240/104* (2013.01); *C10N 2240/14* (2013.01); *C10N 2240/105* (2013.01); *C10N 2240/14* (2013.01); *C10N 2240/30* (2013.01); *C10N 2240/401* (2013.01); *C10N 2240/402* (2013.01); *C10N 2250/10* (2013.01); *C10N 2270/00* (2013.01); *C08F 4/65908* (2013.01); *Y10S 526/943* (2013.01)

(58) Field of Classification Search
CPC ............ C08F 4/65908; C08F 4/65912; C08F 4/65927; C08F 10/14
USPC ........ 526/160, 165, 348.2, 943; 502/103, 152
See application file for complete search history.

(56) References Cited

U.S. PATENT DOCUMENTS

| | | | |
|---|---|---|---|
| 5,854,165 A | 12/1998 | Yabunouchi et al. | |
| 6,169,154 B1 * | 1/2001 | Machida et al. ............... | 526/352 |
| 6,171,994 B1 | 1/2001 | Yabunouchi et al. | |
| 6,232,407 B1 | 5/2001 | Hashidzume et al. | |
| 6,583,239 B2 * | 6/2003 | Minami et al. ................ | 526/127 |
| 7,173,099 B1 | 2/2007 | Minami | |
| 2001/0009950 A1 | 7/2001 | Hashidzume et al. | |
| 2001/0041817 A1 | 11/2001 | Bagheri et al. | |
| 2001/0041818 A1 | 11/2001 | Bagheri et al. | |
| 2002/0010290 A1 | 1/2002 | Minami et al. | |
| 2002/0143113 A1 | 10/2002 | Minami et al. | |
| 2005/0049373 A1 | 3/2005 | Minami et al. | |
| 2006/0111526 A1 | 5/2006 | Minami et al. | |
| 2006/0116303 A1 | 6/2006 | Iimura et al. | |
| 2007/0043192 A1 | 2/2007 | Okamoto et al. | |
| 2009/0082532 A1 | 3/2009 | Fujimura et al. | |

FOREIGN PATENT DOCUMENTS

| | | |
|---|---|---|
| EP | 0 721 954 A1 | 7/1996 |
| EP | 1 227 112 A1 | 7/2002 |
| EP | 1 661 921 A1 | 5/2006 |
| JP | 7-102013 | 4/1995 |
| JP | 2000-63425 | 2/2000 |
| JP | 2000-72825 | 3/2000 |
| JP | 2001-139620 | 5/2001 |
| JP | 2001-335607 | 12/2001 |

(Continued)

OTHER PUBLICATIONS

International Search Report issued Feb. 9, 2010, in PCT/JP2009/071598 (with English Translation of Category of Cited Documents).

(Continued)

*Primary Examiner* — Caixia Lu
(74) *Attorney, Agent, or Firm* — Oblon, McClelland, Maier & Neustadt, L.L.P.

(57) ABSTRACT

Provided is a method of producing an α-olefin polymer including a step of polymerizing one or more kinds of α-olefins each having 6 to 20 carbon atoms with a catalyst obtained by using a specific transition metal compound. By the method, an α-olefin polymer having a viscosity suitable for use in a lubricating oil can be produced on an industrial scale with ease, and further, the characteristics of the product can be widely changed through the control of reaction conditions.

8 Claims, 2 Drawing Sheets

(56) References Cited

FOREIGN PATENT DOCUMENTS

| JP | 2003-510382 | 3/2003 |
| JP | 2003-105016 | 4/2003 |
| JP | 2006-348153 | 12/2006 |
| WO | WO 95/09172 | 4/1995 |
| WO | WO 2005/073242 A1 | 8/2005 |
| WO | WO 2007/011832 A1 | 1/2007 |

OTHER PUBLICATIONS

Singaporean Search Report and Written Opinion issued Sep. 14, 2012, in Singaporean Patent Application No. 201104695-0.

Extended European Search Report Issued Mar. 18, 2013 in Patent Application No. 09835029.1.
Endy Y.-J. Min et al., "Catalyst Site Epimerization during the Kinetic Resolution of Chiral α-Olefins by Polymerization", Organometallics, XP008157307, vol. 27, No. 10, 2008, pp. 2179-2188.
Jeffery A. Byers et al., "Kinetic resolution of racemic α-olefins with *ansa*-zirconocene polymerization catalysts: Enantiomorphic site vs. chain end control", PNAS, XP 008157309, vol. 103, No. 42, Oct. 17, 2006, pp. 15303-15308.
Cliff R. Baar et al., "Kinetic Resolution of Chiral α-Olefins Using Optically Active *ansa*-Zirconocene Polymerization Catalysts", J. Am. Chem. Soc., XP008059629, vol. 126, No. 26, 2004, pp. 8216-8231.

* cited by examiner

PROCESS FOR PRODUCING α-OLEFIN POLYMER, α-OLEFIN POLYMER, AND LUBRICATING OIL COMPOSITION

TECHNICAL FIELD

The present invention relates to a method of producing an α-olefin polymer, an α-olefin polymer obtained by the method of producing the same, and a lubricating oil composition containing the α-olefin polymer.

BACKGROUND ART

As a characteristic, which has been hitherto requested for lubricating oils for automobiles and industrial machines, there is given a relatively high viscosity. Along with a recent improvement in performance of automobiles or industrial machines, further improvement in performance has been requested for those lubricating oils as well. With regard to the improvement in performance of the lubricating oils, developments of various synthetic lubricating oils have been conventionally known. For example, the following technologies have been known about an α-olefin polymer as one kind of component of the synthetic lubricating oils.

Patent Documents 1 and 2 each disclose a method of polymerizing 1-decene with a Friedel-Crafts catalyst using aluminum chloride or boron trifluoride. In addition, an example in which ethylene or an α-olefin is polymerized by any one of the various methods and the resultant polymer is used in a lubricating oil has been known. For example, Patent Document 3 discloses a production method involving the use of a reduced chromium catalyst, Patent Documents 4 and 5 each disclose a production method based on cationic polymerization, Patent Documents 6 and 7 each disclose a production method involving the use of a Ziegler type catalyst, and Patent Documents 8 to 16 each disclose a production method involving the use of a metallocene catalyst.

As described above, various technologies have been conventionally known about a method of producing an α-olefin polymer. However, characteristics requested of the lubricating oils have become more and more sophisticated, and hence additional technological development has been requested of the method of producing an α-olefin polymer. That is, improved fuel efficiency, reduced energy requirements, and a lengthened lifetime have been demanded of each of the lubricating oils in order that the lubricating oils may correspond to recent environmental problems. Accordingly, easy production of an α-olefin polymer capable of corresponding to those problems has been requested. In addition, an ability to produce assorted α-olefin polymers is preferred for providing an optimum lubricating oil in accordance with each of friction conditions and the like. For example, a production method by which the characteristics of an α-olefin polymer can be widely changed through the control of reaction conditions has been desired.

None of the above conventional production methods suffices in such situations. For example, a polymer obtained with the Friedel-Crafts catalyst is poor in viscosity index, low-temperature flowability, and durability. In addition, there have also been problems that boron trifluoride is expensive, and further, discharges fluorine having apparatus corrosiveness. In addition, various problems remain in the production methods involving the use of the other catalysts as well. For example, problems concerning the characteristics of the polymer are problems concerning its molecular weight and low-temperature characteristic. In addition, problems concerning the production methods are, for example, a problem concerning polymerization activity, a problem concerning ethylene as an essential component, a problem concerning a reaction condition such as a high pressure, the addition of a large amount of hydrogen, or a high reaction temperature, a problem concerning dilution with an inert solvent, and a problem concerning an expensive catalyst. As described above, even when any one of the conventional methods of producing an α-olefin polymer is employed, it has been difficult to produce an α-olefin polymer suitable for a lubricating oil on an industrial scale with ease, and it has also been difficult to change the characteristics of the α-olefin polymer widely through the control of reaction conditions.

Patent Document 1: U.S. Pat. No. 3,149,178
Patent Document 2: U.S. Pat. No. 3,382,291
Patent Document 3: JP 09-508151 A
Patent Document 4: JP 08-505888 A
Patent Document 5: JP 2000-351813 A
Patent Document 6: JP 07-145205 A
Patent Document 7: JP 05-271339 A
Patent Document 8: JP 07-133234 A
Patent Document 9: JP 06-80725 A
Patent Document 10: JP 03-131612 A
Patent Document 11: JP 02-169526 A
Patent Document 12: JP 2006-176760 A
Patent Document 13: JP 2005-200454 A
Patent Document 14: JP 2005-200446 A
Patent Document 15: JP 2005-501957 A
Patent Document 16: WO 2007/011459

SUMMARY OF THE INVENTION

Problems to be Solved by the Invention

The present invention has been made in view of the above circumstances, and an object of the present invention is to provide a method of producing an α-olefin polymer by which an α-olefin polymer having a viscosity suitable for use in a lubricating oil can be produced on an industrial scale with ease, and further, the characteristics of the product can be widely changed through the control of reaction conditions.

Means for Solving the Problems

The inventors of the present invention have made extensive studies. As a result, the inventors have found that the above problems can be solved by using a catalyst obtained by using a specific transition metal compound. The present invention has been completed on the basis of such finding.

That is, the present invention provides:

1. a method of producing an α-olefin polymer, including a step of polymerizing one or more kinds of α-olefins each having 6 to 20 carbon atoms with a catalyst obtained by using the following components (A) and (B) (polymerizing step):

(A) a transition metal compound represented by a general formula (I):

[Chem 1]

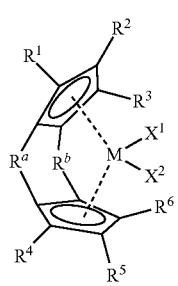

(I)

where $R^1$ to $R^6$ each independently represent a hydrogen atom, a halogen atom, a hydrocarbon group having 1 to 20 carbon atoms, or an organic group having 1 to 20 carbon atoms and containing one or more kinds of atoms selected from a halogen atom, a silicon atom, an oxygen atom, a sulfur atom, a nitrogen atom, and a phosphorus atom, at least one selected from $R^1$ to $R^3$ represents a hydrogen atom, at least one selected from $R^4$ to $R^6$ represents a hydrogen atom, $R^a$ and $R^b$ each independently represent a divalent group for bonding two cyclopentadienyl rings with one to three atoms, $X^1$ and $X^2$ each independently represent a hydrogen atom, a halogen atom, a hydrocarbon group having 1 to 20 carbon atoms, or an organic group having 1 to 20 carbon atoms and containing one or more kinds of atoms selected from a halogen atom, a silicon atom, an oxygen atom, a sulfur atom, a nitrogen atom, and a phosphorus atom, and M represents a transition metal belonging to any one of Groups 4 to 6 of the periodic table; and (B) (b-1) an organic aluminum oxy compound and/or (b-2) an ionic compound capable of reacting with the above transition metal compound to transform the compound into a cation;

2. the method of producing an α-olefin polymer according to the item 1, in which each of $R^1$ to $R^6$ in the general formula (I) represents a hydrogen atom;

3. the method of producing an α-olefin polymer according to the item 1 or 2, in which the polymerizing step includes the step of polymerizing two or more kinds of α-olefins each having 6 to 20 carbon atoms;

4. the method of producing an α-olefin polymer according to any one of the items 1 to 3, in which reaction conditions in the polymerizing step include a hydrogen pressure of 0 to 0.2 MPa (G) and a reaction temperature of 0 to 200° C.;

5. the method of producing an α-olefin polymer according to any one of the items 1 to 4, in which the α-olefin polymer is an α-olefin polymer having a kinematic viscosity at 100° C. of 20 to 1,000 mm²/s;

6. the method of producing an α-olefin polymer according to any one of the items 1 to 5, in which the α-olefin polymer is an α-olefin polymer whose α-olefin unit sequence portion has an isotacticity of 20 to 40% and a syndiotacticity of 40% or less in terms of triad expression;

7. the method of producing an α-olefin polymer according to any one of the items 1 to 6, further including a step of removing α-olefin-based compounds each having 24 or less carbon atoms after the polymerizing step;

8. an α-olefin polymer obtained by the production method according to any one of the items 1 to 7;

9. a hydrogenated α-olefin polymer obtained by hydrogenating the α-olefin polymer according to the item 8; and 10. a lubricating oil composition including the α-olefin polymer according to the item 8 and/or the hydrogenated α-olefin polymer according to the item 9.

The present invention provides a method of producing an α-olefin polymer by which an α-olefin polymer having a viscosity suitable for use in a lubricating oil can be produced on an industrial scale with ease, and further, the characteristics of the product can be widely changed through the control of reaction conditions, to thereby produce an α-olefin polymer having desired characteristics with ease.

BEST MODE FOR CARRYING OUT THE INVENTION

[Method of Producing α-olefin Polymer]

Figure 1:
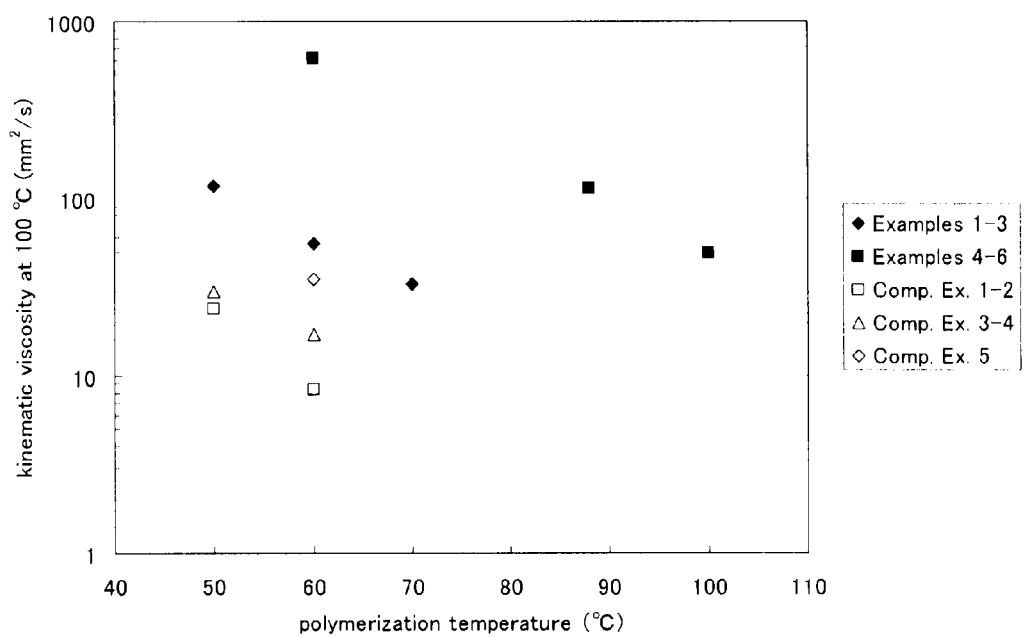
FIG. 1 It is a drawing showing a relation of a reaction temperature for an α-olefin polymer production to a kinematic viscosity at 100° C. of the α-olefin polymer.

A method of producing an α-olefin polymer of the present invention is a method of producing an α-olefin polymer, the method including the step of polymerizing one or more kinds of α-olefins each having 6 to 20 carbon atoms with a specific catalyst (polymerizing step).

In the catalyst used in the present invention, a transition metal compound represented by a general formula (I) is used as a component (A).

[Chem 2]

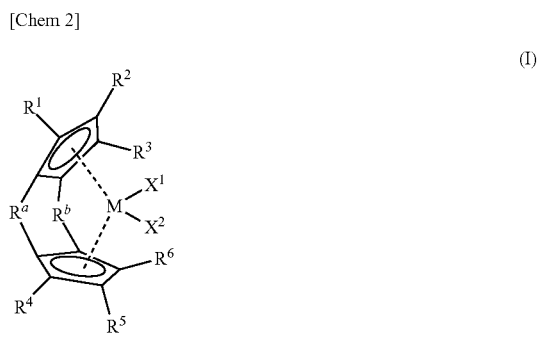

(I)

The compound represented by the general formula (I) is a transition metal compound formed of a doubly crosslinked bis(cyclopentadienyl)-based metallocene complex. In the formula, $R^1$ to $R^6$ each independently represent a hydrogen atom, a halogen atom, a hydrocarbon group having 1 to 20 carbon atoms, or an organic group having 1 to 20 carbon atoms and containing one or more kinds of atoms selected from a halogen atom, a silicon atom, an oxygen atom, a sulfur atom, a nitrogen atom, and a phosphorus atom. The case where the metallocene complex is a complex using a fused cyclopentadienyl group as a ligand such as a doubly crosslinked bis(indenyl)-based metallocene complex is not preferred because a reaction condition such as a high pressure condition, the addition of a large amount of hydrogen, or a high reaction temperature, or dilution with an inert solvent is needed when obtaining an α-olefin polymer having a desired viscosity is tried. $R^1$ to $R^6$ each represent preferably a hydrogen atom or an alkyl group having 1 to 20 carbon atoms, or more preferably a hydrogen atom or an alkyl group having 1 to 4 carbon atoms. At least one selected from $R^1$ to $R^3$ represents a hydrogen atom, and at least one selected from $R^4$ to $R^6$ represents a hydrogen atom. The case where none of $R^1$ to $R^3$ represents a hydrogen atom and none of $R^4$ to $R^6$ represents a hydrogen atom is not preferred either because a reaction condition such as a high pressure condition, the addition of a large amount of hydrogen, or a high reaction temperature, or dilution with an inert solvent is needed when obtaining an α-olefin polymer having a desired viscosity is tried.

$R^a$ and $R^b$ each independently represent a divalent group for bonding two cyclopentadienyl rings with one to three atoms or preferably a group represented by a general formula (II).

[Chem 3]

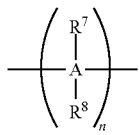
(II)

In the general formula (II), n represents an integer of 1 to 3, $R^7$ and $R^8$ each independently represent a hydrogen atom, a halogen atom, a hydrocarbon group having 1 to 20 carbon atoms, or a halogen-containing hydrocarbon group having 1 to 20 carbon atoms, preferably a hydrogen atom or a hydrocarbon group having 1 to 4 carbon atoms, or more preferably a hydrogen atom or an alkyl group having 1 to 4 carbon atoms, and A represents an atom belonging to Group 14 of the periodic table. Preferred examples of $R^a$ and $R^b$ include —$CR^7R^8$—, —$SiR^7R^8$—, and —$CR^7R^8$—$CR^7R^8$—.

$X^1$ and $X^2$ each independently represent a σ-bonding ligand, for example, a hydrogen atom, a halogen atom, a hydrocarbon group having 1 to 20 carbon atoms, or an organic group having 1 to 20 carbon atoms and containing one or more kinds of atoms selected from a halogen atom, a silicon atom, an oxygen atom, a sulfur atom, a nitrogen atom, and a phosphorus atom, or preferably each independently represent a halogen atom. M represents a transition metal belonging to any one of Groups 4 to 6 of the periodic table or preferably a transition metal belonging to Group 4 of the periodic table.

Examples of the compound represented by the general formula (I) include: a dichloro compound such as
(1,1'-ethylene) (2,2'-ethylene)biscyclopentadienyl zirconium dichloride,
(1,1'-ethylene)(2,2'-ethylene)bis(3-methylcyclopentadienyl) zirconium dichloride,
(1,1'-ethylene) (2,2'-ethylene)bis(4-methylcyclopentadienyl)zirconium dichloride,
(1,1'-ethylene)(2,2'-ethylene)bis(3,4-dimethylcyclopentadienyl) zirconium dichloride,
(1,1'-ethylene)(2,2'-ethylene)bis(3,5-dimethylcyclopentadienyl) zirconium dichloride,
(1,1'-dimethylsilylene)(2,2'-dimethylsilylene)biscyclopentadienyl zirconium dichloride,
(1,1'-dimethylsilylene)(2,2'-dimethylsilylene)bis(3-methylcyclopentadienyl) zirconium dichloride,
(1,1'-dimethylsilylene)(2,2'-dimethylsilylene)bis(4-methylcyclopentadienyl) zirconium dichloride,
(1,1'-dimethylsilylene)(2,2'-dimethylsilylene)bis(3,4-dimethylcyclopentadienyl) zirconium dichloride,
(1,1'-dimethylsilylene)(2,2'-dimethylsilylene)bis(3,5-dimethylcyclopentadienyl) zirconium dichloride,
(1,1'-dimethylsilylene)(2,2'-ethylene)biscyclopentadienyl zirconium dichloride,
(1,1'-dimethylsilylene)(2,2'-ethylene)bis(3-methylcyclopentadienyl) zirconium dichloride,
(1,1'-dimethylsilylene)(2,2'-ethylene)bis(4-methylcyclopentadienyl) zirconium dichloride,
(1,1'-dimethylsilylene)(2,2'-ethylene)bis(3,4-dimethylcyclopentadienyl) zirconium dichloride,
(1,1'-dimethylsilylene)(2,2'-ethylene)bis(3,5-dimethylcyclopentadienyl) zirconium dichloride,
(1,1'-isopropylidene)(2,2'-dimethylsilylene)biscyclopentadienyl zirconium dichloride,
(1,1'-isopropylidene)(2,2'-dimethylsilylene)bis(3-methylcyclopentadienyl) zirconium dichloride,
(1,1'-isopropylidene)(2,2'-dimethylsilylene)bis(4-methylcyclopentadienyl) zirconium dichloride,
(1,1'-isopropylidene)(2,2'-dimethylsilylene)bis(3,4-dimethylcyclopentadienyl) zirconium dichloride,
(1,1'-isopropylidene)(2,2'-dimethylsilylene)bis(3,5-dimethylcyclopentadienyl) zirconium dichloride,
(1,1'-isopropylidene)(2,2'-isopropylidene)bis(3-methylcyclopentadienyl) zirconium dichloride,
(1,1'-isopropylidene)(2,2'-isopropylidene)bis(4-methylcyclopentadienyl) zirconium dichloride,
(1,1'-isopropylidene)(2,2'-isopropylidene)bis(3,4-dimethylcyclopentadienyl) zirconium dichloride, and
(1,1'-isopropylidene)(2,2'-isopropylidene)bis(3,5-dimethylcyclopentadienyl) zirconium dichloride; a dimethyl compound, a diethyl compound, a dihydro compound, a diphenyl compound, and a dibenzyl compound of the above compounds; and titanium and hafnium complexes thereof.

One kind of a transition metal compound may be used as the component (A), or two or more kinds of transition metal compounds may be used in combination as the component.

In the catalyst used in the present invention, (b-1) an organic aluminum oxy compound and/or (b-2) an ionic compound capable of reacting with the above transition metal compound to transform the compound into a cation are each/is used as a component (B).

Examples of (b-1) the organic aluminum oxy compound include a chain aluminoxane represented by the following general formula (III):

[Chem 4]

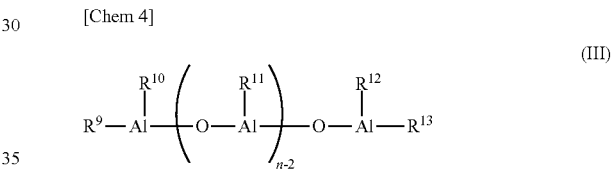
(III)

and a cyclic aluminoxane represented by the following general formula (IV).

[Chem 5]

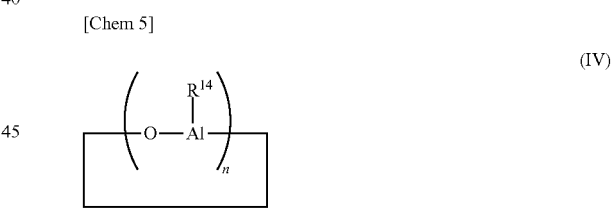
(IV)

In the general formulae (III) and (IV), $R^9$ to $R^{14}$ each represent a hydrocarbon group having 1 to 20, or preferably 1 to 12, carbon atoms, or a halogen atom. Examples of the hydrocarbon group include an alkyl group, an alkenyl group, an aryl group, and an arylalkyl group, and n represents a degree of polymerization and is an integer of typically 2 to 50 or preferably 2 to 40. It should be noted that $R^9$ to $R^{14}$ may be identical to or different from each other.

Specific examples of the aluminoxanes include methylaluminoxane, ethylaluminoxane, and isobutylaluminoxane.

A method of producing each of the aluminoxanes is, for example, a method involving bringing an alkylaluminum and a condensation agent such as water into contact with each other. However, an approach to the contact is not particularly limited, and the alkylaluminum and the condensation agent have only to be caused to react with each other in conformity with a known method. Available is, for example, a method involving dissolving an organic aluminum compound in an organic solvent and bringing the solution into contact with water, a method involving adding an organic aluminum compound at the beginning of polymerization and adding water to the compound, a method involving causing crystal water in a metal salt or the like or water adsorbing to an inorganic or organic substance to react with an organic aluminum compound, or a method involving causing a trialkylaluminum to react with a tetraalkyldialuminoxane and causing water to react with the resultant. It should be noted that the aluminoxanes may be insoluble in toluene. One kind of those aluminoxanes may be used, or two or more kinds of them may be used in combination.

On the other hand, any ionic compound that may react with the transition metal compound as the component (A) to convert to a cation can be used as the component (b-2), and a compound represented by the following general formula (V) or (VI) can be preferably used.

  (V)

  (VI)

In the general formula (V), $L^1$ represents a Lewis base and $R^{15}$ represents a hydrogen atom, an alkyl group having 1 to 20 carbon atoms, or a hydrocarbon group having 6 to 20 carbon atoms selected from an aryl group, an alkylaryl group, and an arylalkyl group.

Here, specific examples of $L^1$ include: amines such as ammonia, methyl amine, aniline, dimethyl amine, diethyl amine, N-methyl aniline, diphenyl amine, N,N-dimethyl aniline, trimethyl amine, triethyl amine, tri-n-butyl amine, methyldiphenyl amine, pyridine, p-bromo-N,N-dimethyl aniline, and p-nitro-N,N-dimethyl aniline; phosphines such as triethylphosphine, triphenylphosphine, and diphenyl phosphine; thioethers such as tetrahydrothiophene; esters such as ethyl benzoate; and nitriles such as acetonitrile and benzonitrile. Specific examples of $R^{15}$ include a hydrogen atom, a methyl group, an ethyl group, a benzyl group, and a trityl group.

In the general formula (VI), $L^2$ represents $M^1$, $R^{16}R^{17}M^2$, $R^{18}C$, or $R^{19}M^2$. $R^{16}$ and $R^{17}$ each represent a cyclopentadienyl group, a substituted cyclopentadienyl group, an indenyl group, or a fluorenyl group. $R^{18}$ represents an alkyl group having 1 to 20 carbon atoms, or a hydrocarbon group having 6 to 20 carbon atoms selected from an aryl group, an alkylaryl group, and an arylalkyl group. $R^{19}$ represents a macrocyclic ligand such as tetraphenylporphyrin or phthalocyanine.

$M^1$ contains an element belonging to any one of Groups 1 to 3, 11 to 13, and 17 of the periodic table, and $M^2$ represents an element belonging to any one of Groups 7 to 12 of the periodic table.

Here, specific examples of $R^{16}$ and $R^{17}$ include a cyclopentadienyl group, a methylcyclopentadienyl group, an ethylcyclopentadienyl group, and a pentamethylcyclopentadienyl group. Specific examples of $R^{18}$ include a phenyl group, a p-tolyl group, and a p-methoxyphenyl group, and specific examples of $R^{19}$ include tetraphenylporphyrin and phthalocyanine. In addition, specific examples of $M^1$ include Li, Na, K, Ag, Cu, Br, I, and $I_3$, and specific examples of $M^2$ include Mn, Fe, Co, Ni, and Zn.

In the general formulae (V) and (VI):

k represents the ionic valence of each of $[L^1-R^{15}]$ and $[L^2]$ which is an integer of 1 to 3, a represents an integer of 1 or more, and b=(k×a);

$[Z]^-$ represents an uncoordinated anion $[Z^1]^-$ or $[Z^2]^-$.

$[Z^1]^-$ represents an anion obtained by bonding multiple groups to an element, that is, $[M^3G^1G^2 \ldots G^f]^-$. Here, $M^3$ represents an element belonging to any one of Groups 5 to 15 of the periodic table, or preferably an element belonging to any one of Groups 13 to 15 of the periodic table. $G^1$ to $G^f$ each represent a hydrogen atom, a halogen atom, an alkyl group having 1 to 20 carbon atoms, a dialkylamino group having 2 to 40 carbon atoms, an alkoxy group having 1 to 20 carbon atoms, an aryl group having 6 to 20 carbon atoms, an aryloxy group having 6 to 20 carbon atoms, an alkylaryl group having 7 to 40 carbon atoms, an arylalkyl group having 7 to 40 carbon atoms, a halogen-substituted hydrocarbon group having 1 to 20 carbon atoms, an acyloxy group having 1 to 20 carbon atoms, an organic metalloid group, or a hetero atom-containing hydrocarbon group having 2 to 20 carbon atoms. Two or more of $G^1$ to $G^f$ may form a ring. f represents an integer obtained from [(valence of central metal $M^3$)+1].

$[Z^2]^-$ represents a conjugate base of a Bronsted acid alone, or a combination of a Bronsted acid and a Lewis acid, the Bronsted acid having a logarithm of the reciprocal acid dissociation constant (pKa) of −10 or less, or a conjugate base of an acid generally defined as a superacid. In addition, $[Z^2]^-$ may be coordinated with a Lewis base.

Here, specific examples of $M^3$ in $[Z^1]^-$, i.e., $[M^3G^1G^2 \ldots G^f]^-$ include B, Al, Si, P, As, and Sb, and preferred are B and Al. Further, specific examples of $G^1$, and $G^2$ to $G^f$ include: a dimethylamino group and a diethylamino group as dialkylamino groups; a methoxy group, an ethoxy group, an n-propoxy group, and a phenoxy group as alkoxy groups or aryloxy groups; a methyl group, an ethyl group, an n-propyl group, an isopropyl group, an n-butyl group, an isobutyl group, an n-octyl group, a n-eicosyl group, a phenyl group, a p-tolyl group, a benzyl group, a 4-t-butylphenyl group, and a 3,5-dimethylphenyl group as hydrocarbon groups; a fluorine atom, a chlorine atom, a bromine atom, and an iodine atom as halogen atoms; a p-fluorophenyl group, a 3,5-difluorophenyl group, a pentachlorophenyl group, a 3,4,5-trifluorophenyl group, a pentafluorophenyl group, a 3,5-bis(trifluoromethyl) phenyl group, a bis(trimethylsilyl)methyl group as hetero atom-containing hydrocarbon groups; and a pentamethylantimony group, a trimethylsilyl group, a trimethylgermyl group, a diphenylarsine group, a dicyclohexylantimony group, and a diphenylboron group as organic metalloid groups.

Further, specific examples of $[Z^2]^-$ as an uncoordinated anion, that is, conjugate base of a Bronsted acid alone, or a combination of a Bronsted acid and a Lewis acid, the Bronsted acid having pKa of −10 or less, include a trifluoromethanesulfonate anion $(CF_3SO_3)^-$, a bis(trifluoromethanesulfonyl)methyl anion, a bis(trifluoromethanesulfonyl)benzyl anion, a bis(trifluoromethanesulfonyl)amide, a perchlorate anion $(ClO_4)^-$, a trifluoroacetate anion $(CF_3COO)^-$, a hexafluoroantimony anion $(SbF_6)^-$, a fluorosulfonate anion $(FSO_3)^-$, a chlorosulfonate anion $(ClSO_3)^-$, a fluorosulfonate anion/antimony pentafluoride $(FSO_3/SbF_5)^-$, a fluorosulfonate anion/arsenic pentafluoride $(FSO_3/AsF_5)^-$, and a trifluoromethanesulfonate anion/antimony pentafluoride $(CF_3SO_3/SbF_5)^-$.

Specific examples of such compounds of component (b-2) include triethylammonium tetraphenylborate, tri-n-butylammonium tetraphenylborate, trimethylammonium tetraphenylborate, tetraethylammonium tetraphenylborate, methyl (tri-n-butyl)ammonium tetraphenylborate, benzyl(tri-n-butyl)ammonium tetraphenylborate, dimethyldiphenylammonium tetraphenylborate, triphenyl (methyl)ammonium tetraphenylborate, trimethylanilinium tetraphenylborate, methylpyridinium tetraphenylborate, benzylpyridinium tetraphenylborate, methyl(2-cyanopyridinium) tetraphenylborate, triethylammonium tetrakis(pentafluorophenyl)borate, tri-n-butylammonium tetrakis (pentafluorophenyl)borate, triphenylammonium tetrakis (pentafluorophenyl)borate, tetra-n-butyl-ammonium tetrakis (pentafluorophenyl)borate, tetraethylammonium tetrakis (pentafluorophenyl)borate, benzyl(tri-n-butyl)ammonium tetrakis(pentafluorophenyl)borate, methyldiphenylammonium tetrakis(pentafluorophenyl)borate, triphenyl(methyl) ammonium tetrakis(pentafluorophenyl)borate, methylanilinium tetrakis(pentafluorophenyl)borate, dimethylanilinium tetrakis(pentafluorophenyl)borate, trimethylanilinium tetrakis(pentafluorophenyl)borate, methylpyridinium tetrakis(pentafluorophenyl)borate, benzylpyridinium tetrakis(pentafluorophenyl)borate, methyl(2-cyanopyridinium) tetrakis(pentafluorophenyl)borate, benzyl (2-cyanopyridinium) tetrakis(pentafluorophenyl)borate, methyl(4-cyanopyridinium) tetrakis(pentafluorophenyl)borate, triphenylphosphonium tetrakis(pentafluorophenyl)borate, dimethylanilinium tetrakis[bis(3,5-ditrifluoromethyl) phenyl]borate, ferrocenium tetraphenylborate, silver tetraphenylborate, trityl tetraphenylborate, tetraphenylporphyrin manganese tetraphenylborate, ferrocenium tetrakis (pentafluorophenyl)borate, (1,1'-dimethylferrocenium)tetrakis(pentafluorophenyl)borate, decamethylferrocenium tetrakis(pentafluorophenyl)borate, silver tetrakis(pentafluorophenyl)borate, trityl tetrakis(pentafluorophenyl)borate, lithium tetrakis(pentafluorophenyl)borate, sodium tetrakis (pentafluorophenyl)borate, tetraphenylporphyrin manganese tetrakis(pentafluorophenyl)borate, silver tetrafluoroborate, silver hexafluorophosphate, silver hexafluoroarsenate, sliver perchlorate, silver trifluoroacetate, and silver trifluoromethanesulfonate.

One kind of component (b-2) may be used alone, or two or more kinds thereof may be used in combination. A usage ratio between the components (A) and (B) in the present invention is as described below. When the component (b-1) is used as the component (B), the molar ratio between them is preferably 1:1 to 1:1,000,000 or more preferably 1:10 to 1:10,000. When the component (b-2) is used as the component (B), the molar ratio between them is preferably 10:1 to 1:100 or more preferably 2:1 to 1:10. In addition, one kind of components (b-1), (b-2), and the like may be used alone as the component (B), or two or more kinds of them may be used in combination as the component.

The catalyst in the present invention may contain the components (A) and (B) as main components, or may contain the components (A) and (B), and (C) an organic aluminum compound as main components. Here, a compound represented by the general formula (VII) is used as the organic aluminum compound as the component (C).

$$(R^{20})_v AlQ_{3-v} \quad \quad (VII)$$

(In the formula, $R^{20}$ represents an alkyl group having 1 to 10 carbon atoms, Q represents a hydrogen atom, an alkoxy group having 1 to 20 carbon atoms, an aryl group having 6 to 20 carbon atoms, or a halogen atom, and v represents an integer of 1 to 3.)

Specific examples of the compound represented by the general formula (VII) include trimethylaluminum, triethylaluminum, triisopropylaluminum, triisobutylaluminum, dimethylaluminum chloride, diethylaluminum chloride, methylaluminum dichloride, ethylaluminum dichloride, dimethylaluminum fluoride, diisobutylaluminum hydride, diethylaluminum hydride, and ethylaluminumsesquichloride. Those organic aluminum compounds may be used alone, or two or more kinds thereof may be used in combination. A usage ratio between the components (A) and (C) is preferably 1:1 to 1:10,000, more preferably 1:5 to 1:2,000, or still more preferably 1:10 to 1:1,000 in terms of a molar ratio. The use of the component (C) can improve activity per transition metal. However, an excessively large amount of the organic aluminum compound is not preferred because the organic aluminum compound wastes, and remains in a large amount in the α-olefin polymer.

In the present invention, at least one kind of catalyst component can be used in a state of being carried by a proper carrier. The kind of the carrier is not particularly limited, and any one of an inorganic oxide carrier, an inorganic carrier except the foregoing, and an organic carrier can be used. The inorganic oxide carrier or the inorganic carrier except the foregoing is particularly preferred in terms of morphology control.

Specific examples of the inorganic oxide carrier include $SiO_2$, $Al_2O_3$, MgO, $ZrO_2$, $TiO_2$, $Fe_2O_3$, $B_2O_3$, CaO, ZnO, BaO, and $ThO_2$, and mixtures of them such as silica alumina, zeolite, ferrite, and glass fibers. Of those, $SiO_2$ and $Al_2O_3$ are particularly preferred. It should be noted that the above inorganic oxide carrier may contain a small amount of, for example, a carbonate, nitrate, or sulfate. Meanwhile, examples of the carrier except the foregoing include magnesium compounds represented by a general formula "Mg($R^{21}$)$_a X_b$" typified by, for example, magnesium compounds such as $MgCl_2$ and $Mg(OC_2H_5)_2$, and complex salts of the compounds. Here, $R^{21}$ represents an alkyl group having 1 to 20 carbon atoms, an alkoxy group having 1 to 20 carbon atoms, or an aryl group having 6 to 20 carbon atoms, X represents a halogen atom or an alkyl group having 1 to 20 carbon atoms, a represents 0 to 2, b represents 0 to 2, and a+b=2. The respective $R^{21}$'s or the respective X's may be identical to or different from each other.

In addition, examples of the organic carrier include: polymers such as a polystyrene, a styrene-divinylbenzene copolymer, a polyethylene, a polypropylene, a substituted polystyrene, and a polyallylate; starch; and carbon. The carrier used in the present invention is preferably, for example, $MgCl_2$, $MgCl(OC_2H_5)$, $Mg(OC_2H_5)_2$, $SiO_2$, or $Al_2O_3$. Although the properties of the carrier vary depending on the kind of, and a production process for, the carrier, the carrier has an average particle diameter of typically 1 to 300 μm, preferably 10 to 200 μm, or more preferably 20 to 100 μm. When the particle diameter is small, the amount of a fine powder in the α-olefin polymer increases. When the particle diameter is large, the amount of coarse particles in the α-olefin polymer increases to be responsible for a reduction in bulk density or the clogging of a hopper. In addition, the carrier has a specific surface area of typically 1 to 1,000 m$^2$/g or preferably 50 to 500 m$^2$/g and a pore volume of typically 0.1 to 5 cm$^3$/g or preferably 0.3 to 3 cm$^3$/g. When one of the specific surface area and the pore volume deviates from the above range, the activity of the catalyst may reduce. It should be noted that the specific surface area and the pore volume can each be determined from, for example, the volume of a nitrogen gas adsorbed in accordance with a BET method (see "J. Am. Chem. Soc., 60, 309 (1983)"). Further, the above carrier is desirably used after having been baked at typically 150 to 1,000° C. or preferably 200 to 800° C.

When the carrier is caused to carry at least one kind of catalyst component, the carrier is desirably caused to carry at least one of the components (A) and (B), or preferably both of the components (A) and (B). Although a method of causing the carrier to carry at least one of the components (A) and (B) is not particularly limited, available is, for example, a method involving mixing at least one of the components (A) and (B), and the carrier, a method involving treating the carrier with an organic aluminum compound or a halogen-containing silicon compound and mixing the treated product with at least one of the components (A) and (B) in an inert solvent, a method involving causing the carrier, the component (A) and/or the component (B), and the organic aluminum compound or the halogen-containing silicon compound to react with one another, a method involving causing the carrier to carry the component (A) or (B) and mixing the resultant with the component (B) or (A), a method involving mixing a product obtained by a contact reaction between the components (A) and (B) with the carrier, or a method involving causing the carrier to coexist at the time of a contact reaction between the components (A) and (B). It should be noted that the organic aluminum compound as the component (C) can also be added in any one of the above reactions.

The catalyst thus obtained may be used in polymerization after having been extracted as a solid through the removal of a solvent by distillation, or may be used in the polymerization as it is. In addition, in the present invention, the catalyst can be produced by performing the operation of causing the carrier to carry at least one of the components (A) and (B) in a polymerization system. Available is, for example, a method involving adding at least one of the components (A) and (B), and the carrier, and as required, the organic aluminum compound as the component (C), adding, to the mixture, an olefin such as ethylene at normal pressure to 2 MPa, and subjecting the resultant mixture to preliminary polymerization at −20 to 200° C. for about 1 minute to 2 hours, to thereby produce catalyst particles.

In the present invention, it is desired that a usage ratio between the component (b-1) and the carrier be preferably 1:0.5 to 1:1,000 or more preferably 1:1 to 1:50 in terms of a mass ratio, and a usage ratio between the component (b-2) and the carrier be preferably 1:5 to 1:10,000 or more preferably 1:10 to 1:500 in terms of a mass ratio. When two or more kinds of catalyst components (B) are used as a mixture, a usage ratio between each of the components (B) and the carrier desirably falls within the above range in terms of a mass ratio. In addition, it is desired that a usage ratio between the component (A) and the carrier be preferably 1:5 to 1:10,000 or more preferably 1:10 to 1:500 in terms of a mass ratio. In addition, the catalyst in the present invention may contain the components (A), (B), and (C) as main components. A usage ratio between the component (B) and the carrier, and a usage ratio between the component (A) and the carrier each desirably fall within the above range in terms of a mass ratio. As described above, a molar ratio of the amount of the component (C) in this case to the amount of the component (A) is preferably 1:1 to 1:10,000, more preferably 1:5 to 1:2,000, or still more preferably 1:10 to 1:1,000. When the usage ratio between the component (B) (the component (b-1) or the component (b-2)) and the carrier, the usage ratio between the component (A) and the carrier, or the usage ratio between the component (C) and the component (A) deviates from the above range, the activity may reduce. The catalyst of the present invention thus prepared has an average particle diameter of typically 2 to 200 µm, preferably 10 to 150 µm, or particularly preferably 20 to 100 µm and a specific surface area of typically 20 to 1,000 m$^2$/g or preferably 50 to 500 m$^2$/g. When the average particle diameter is less than 2 µm, the amount of a fine powder in the polymer may increase. When the average particle diameter exceeds 200 µm, the amount of coarse particles in the polymer may increase. When the specific surface area is less than 20 m$^2$/g, the activity may reduce. When the specific surface area exceeds 1,000 m$^2$/g, the bulk density of the polymer may reduce. In addition, a transition metal amount in 100 g of the carrier in the catalyst of the present invention is typically 0.05 to 10 g or particularly preferably 0.1 to 2 g. When the transition metal amount deviates from the above range, the activity may reduce. As described above, an industrially advantageous production method can be obtained by causing the carrier to carry at least one kind of the catalyst components.

One kind or more of α-olefins having 6 to 20 carbon atoms are used as raw material monomers in the polymerization step in the method of producing an α-olefin polymer of the present invention. Examples of the α-olefins having 6 to 20 carbon atoms include 1-hexene, 4-methyl-1-pentene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, and 1-eicosene, and one kind or two or more kinds thereof are used. Of those, more preferred are α-olefins having 6 or more to 14 or less carbon atoms, and particularly preferred are α-olefins having 8 or more to 12 or less carbon atoms, which are easily obtainable and inexpensive.

In the present invention, a polymerization method is not particularly limited, and any one of the methods including a bulk polymerization method, a solution polymerization method, a suspension polymerization method, a slurry polymerization method, and a vapor phase polymerization method may be employed. With regard to polymerization conditions, a polymerization temperature is typically 0 to 200° C., preferably 30 to 150° C., or more preferably 40 to 120° C. In addition, a usage ratio of the catalyst to a raw material monomer is such that a molar ratio "raw material monomer/the above component (A)" is preferably 1 to $10^8$ or particularly preferably 100 to $10^5$. Further, a polymerization time is typically 5 minutes to 20 hours, and a reaction pressure is preferably normal pressure to 0.2 MPaG or particularly preferably normal pressure to 0.1 MPaG.

In the production method of the present invention, polymerization is preferably performed without a solvent from the viewpoint of productivity, but a solvent may be used. In the case of using a solvent, examples of the solvent which may be used include: aromatic hydrocarbons such as benzene, toluene, xylene, and ethylbenzene; alicyclic hydrocarbons such as cyclopentane, cyclohexane, and methylcyclohexane; aliphatic hydrocarbons such as pentane, hexane, heptane, and octane; and halogenated hydrocarbons such as chloroform and dichloromethane. One kind of solvent may be used alone or two or more kinds thereof may be used in combination. In addition, a monomer such as 1-butene may also be used as the solvent.

In the production method of the present invention, the activity is improved by adding hydrogen upon polymerization of an α-olefin having 6 to 20 carbon atoms. When hydrogen is used, its pressure is typically 0.2 MPaG or less, preferably 0.001 to 0.1 MPaG, or more preferably 0.01 to 0.1 MPaG.

In the present invention, preliminary polymerization can be performed by using the catalyst for polymerization. The preliminary polymerization can be performed by bringing, for example, a small amount of an olefin into contact with the catalyst components. However, a method for the preliminary polymerization is not particularly limited, and a known method can be employed. The olefin used in the preliminary polymerization is not particularly limited, and examples of the olefin include ethylene, an α-olefin having 3 to 20 carbon atoms, and mixtures of them. It is advantageous to use the same olefin as the monomer used in the polymerization. In addition, a temperature for the preliminary polymerization is typically −20 to 200° C., preferably −10 to 130° C., or more preferably 0 to 80° C. In the preliminary polymerization, an inert hydrocarbon, an aliphatic hydrocarbon, an aromatic hydrocarbon, a monomer, or the like can be used as a solvent.

Of those, the aliphatic hydrocarbon is particularly preferred. Alternatively, the preliminary polymerization may be performed in the absence of any solvent. Conditions for the preliminary polymerization are preferably adjusted so that the amount of a preliminary polymerization product with respect to 1 mmol of a transition metal component in the catalyst may be 1 to 10,000 g or particularly 1 to 1,000 g.

A method of adjusting the molecular weight of the polymer in the production method of the present invention is, for example, a method involving selecting the kinds and usages of the respective catalyst components, and a polymerization temperature, a method involving adding hydrogen, or a method involving adding an inert gas such as nitrogen.

When the α-olefin polymer is used in a lubricating oil, α-olefin-based compounds each having 24 or less carbon atoms (an α-olefin and an α-olefin oligomer) are preferably removed after the above polymerizing step. A method for the removal is, for example, a method involving performing distillation under reduced pressure.

In addition, subjecting the α-olefin polymer to a hydrogenation treatment to produce a hydrogenated α-olefin polymer is preferred from the viewpoint of an improvement in the stability. A method for the hydrogenation is not particularly limited, and a known method can be employed.

The employment of the production method of the present invention can produce an α-olefin polymer having a viscosity suitable for use in a lubricating oil on an industrial scale with ease. Further, the control of the reaction conditions such as the adjustment of the reaction temperature can widely change the characteristics of the product.

It should be noted that the above phrase "produce on an industrial scale with ease" means, for example, that the usage and compression force of hydrogen may be small, that a reaction temperature which is relatively moderate and easy to control is adopted, or that the step of dilution with an inert solvent is not needed.

[α-olefin Polymer]

An α-olefin polymer of the present invention is an α-olefin polymer obtained by the above production method, and preferably has a kinematic viscosity at 100° C. measured in conformity with JIS K 2283 of 20 to 1,000 mm$^2$/s. When the kinematic viscosity at 100° C. falls within the above range, the polymer can be suitably used as a high-viscosity lubricating oil component. From the foregoing viewpoint, the kinematic viscosity at 100° C. is more preferably 25 to 800 mm$^2$/s or particularly preferably 30 to 700 mm$^2$/s.

The α-olefin polymer of the present invention has a number-average molecular weight of typically 1,500 to 10,000, preferably 1,800 to 8,000, or more preferably 2,000 to 7,000 and a molecular weight distribution (Mw/Mn) of typically 1.5 to 4. Those values can be determined by gel permeation chromatography.

The α-olefin polymer of the present invention is such that its α-olefin unit sequence portion has an isotacticity of typically 20 to 40% or preferably 25 to 35% and a syndiotacticity of typically 40% or less or preferably 15 to 35% in terms of triad expression. The polymer shows a good low-temperature characteristic when the polymer satisfies the above stereoregularity.

The α-olefin polymer of the present invention is characterized in that the polymer has a lower pour point and a higher viscosity index than those of a polymer obtained by a conventional production method. For example, an α-olefin polymer having a kinematic viscosity at 100° C. of about 40 mm$^2$/s has a pour point of −45° C. or lower and a viscosity index (VI) of 170 or more in ordinary cases. In addition, an α-olefin polymer having a kinematic viscosity at 100° C. of about 100 mm$^2$/s has a pour point of −40° C. or lower and a viscosity index (VI) of 190 or more in ordinary cases.

[Lubricating Oil Composition]

A lubricating oil composition of the present invention contains the α-olefin polymer and/or the hydrogenated α-olefin polymer, and typically contains those polymers at a content of 0.01 to 100 mass % with reference to the total amount of the composition.

The manner in which the α-olefin polymer or the hydrogenated α-olefin polymer is used in the lubricating oil composition of the present invention is not particularly limited, and any such polymer may be used as a base oil, or may be used as an additive. When any such polymer is used as a base oil, the polymer to be used can be selected from a wide range from a polymer having a low molecular weight to a polymer having a high molecular weight. When any such polymer is used as a base oil, the polymer may be used alone, or may be used as a mixture with any other base oil. Although a ratio of the mixture is not particularly limited, the ratio is typically 1 to 100 mass % with reference to the total amount of the composition. When any such polymer is used as an additive, the polymer is utilized as, for example, a viscosity index improver. In this case, an α-olefin polymer having a relatively high molecular weight is preferably used. The α-olefin polymer having a high molecular weight is, for example, a polymer having a number-average molecular weight in excess of 5,000. In addition, the polymer is typically added at a content of 0.01 to 33 mass % with reference to the total amount of the composition.

Any one of the various known additives can be appropriately blended into the lubricating oil composition of the present invention to such an extent that the object of the present invention is not inhibited. Examples of the additive include: a phosphorus-based extreme pressure agent such as a phosphoric acid ester and a phosphorous acid ester; an oiliness agent including a carboxylic acid such as oleic acid, stearic acid, and dimer acid, and esters thereof; an anti-wear agent such as zinc dithiophosphate (ZnDTP, excluding an aryl type), zinc dithiocarbamate (ZnDTC), oxymolybdenum dithiocarbamate sulfide (MoDTC), nickel dithiophosphate (NiDTP), and nickel dithiocarbamate (NiDTC); amine-based and phenol-based antioxidants; a metal deactivator such as thiadiazole and benzotriazole; a sludge dispersing agent such as an alkenyl succinic acid and esters and imides thereof; a rust inhibitor such as a sorbitan ester and a sulfonate, a phenate, and a salicylate of neutral alkaline earth metals; and a deformer such as dimethylpolysiloxane and polyacrylate.

The application of the lubricating oil composition of the present invention is not particularly limited, and the lubricating oil composition may be used as an internal combustion engine oil such as a gasoline engine oil (2 cycles and 4 cycles) or a diesel engine oil, a drive system oil such as a gear oil, ATF (automatic transmission fluid), PSF (power steering fluid), or a buffer oil, an equipment oil such as a chassis oil, a turbine oil, an operating oil, a machine tool oil, or a refrigerator oil, a processing oil such as a rolling oil, a cutting and grinding oil, or a heat treatment oil, grease, or the like.

EXAMPLES

Next, the present invention is described in more detail with reference to examples, but the present invention is not limited thereto.

An α-olefin polymer was evaluated for its physical properties by the following methods.

(1) Pour Point

Measurement was performed in conformity with JIS K 2269.

(2) Kinematic Viscosity and Viscosity Index

A kinematic viscosity was measured in conformity with JIS K 2283. A viscosity index was determined from the kinematic viscosity through a calculation in conformity with JIS K 2283.

(3) Number-Average Molecular Weight and Molecular Weight Distribution (Mw/Mn)

Determination was performed with a GPC-900 manufactured by JASCO Corporation (column; TOSOH TSK-GEL MULTIPORE HXL-M (two)+Shodex KF801 (one)) and tetrahydrofuran as a solvent at a temperature of 23° C. in terms of polystyrene.

(4) Stereoregularity, Terminal Structure, and Branched Structure

Determination was performed by employing $^{13}$C-NMR according to the method described in [Macromolecules 24, 2334 (1991); Polymer, 30, 1350 (1989)].

Production Example 1

Synthesis of (1,1'-dimethylsilylene)(2,2'-dimethylsilylene)-bis(cyclopentadienyl) zirconium dichloride About 13.8 g (600 mmol) of metal Na and 400 ml of dry tetrahydrofuran (THF) were loaded into a 1,000-ml three-necked flask replaced with nitrogen, and the mixture was stirred at 0° C. 5 minutes after that, 1 to 2 ml of cyclopentadiene were dropped to the mixture. Once the generation of hydrogen stopped, 1 to 2 ml of cyclopentadiene were newly added to the resultant mixture. The above operation was repeated until a total of 50 ml (600 mmol) of cyclopentadiene were added. The reaction solution changed from a colorless, transparent one to an incarnadine one. After THF had been removed by distillation under reduced pressure, the resultant crystal was washed with hexane twice and solidified by drying under reduced pressure. As a result, cyclopentadienyl sodium as a pink powder was obtained.

457 ml of THF were added to 43.0 g (480 mmol) of cyclopentadienyl sodium at 0° C., and the mixture was stirred. The mixture was cooled to −78° C., and 29.2 ml (480 mmol) of dichlorodimethylsilane were slowly dropped to the solution. The solution changed from a pink one to a white one. After the solution had been stirred at room temperature overnight, THF was removed by distillation. As a result, a yellow powder [Compound (1)] was obtained.

Compound (1) was extracted with 150 ml of hexane, and the supernatant was transferred to a 1,000-ml three-necked flask replaced with nitrogen. After the supernatant had been cooled to −78° C., 175.8 ml (480 mmol) of n-butyllithium (2.73 mol/l) were dropped to the supernatant. The reaction solution changed from a yellow one to an opaque one. After the solution had been stirred at room temperature overnight, the supernatant was removed by distillation through filtration. The resultant white solid was washed with 100 ml of hexane. The washed product was dried under reduced pressure. As a result, a dilithium salt [Compound (2)] as a white powder was obtained.

50 ml of diethyl ether and 100 ml of hexane were added to 27.4 g (137 mmol) of Compound (2). After the mixture had been cooled to −78° C., 16.7 ml (137 mmol) of dichlorodimethylsilane were slowly dropped to the mixture. After the resultant mixture had been stirred at room temperature for 5 hours, the precipitate was removed by filtration, and the filtrate was concentrated. Then, recrystallization from hexane was performed. As a result, 4.05 g of Compound (3) as a needle-like transparent crystal were obtained (in 12% yield).

In a 200-ml Schlenk flask replaced with nitrogen, 4.05 g (16.6 mmol) of Compound (3) were dissolved in 60 ml of hexane, and the solution was stirred. After the solution had been cooled to −78° C., 12.1 ml (33.1 mmol) of n-butyllithium (2.73 mol/l) were dropped to the solution, and the mixture was stirred at room temperature overnight. After the solvent of the opaque solution had been removed by distillation under reduced pressure, the precipitate was washed with 20 ml of hexane. The washed product was dried under reduced pressure. As a result, a dilithium salt [Compound (4)] as a white powder was obtained.

34 ml of toluene were added to Compound (4). A suspension of 3.9 g (16.6 mmol) of zirconium tetrachloride in 51 ml of toluene was dropped to the above suspension at −20° C. After the mixture had been stirred at room temperature overnight, the solvent was removed by distillation under reduced pressure. As a result, a target product [Compound (5)] was obtained. Compound (5) was extracted with 30 ml of dichloromethane, and the filtrate was concentrated. The concentrated product was washed with 10 ml of hexane, and was then dried under reduced pressure. As a result, 500 mg of Compound (5) were obtained (in 7.4% yield). The determination of the $^1$H-NMR of the compound provided the following results.

$^1$H-NMR (500 MHz, CDCl$_3$) δ: 0.49 [6H, s, (CH$_3$)$_2$Si], 0.87 [6H, s, (CH$_3$)$_2$Si], 6.40 (2H, t, —CH—), 6.89 (4H, d, —CH—).

Production Example 2

Synthesis of (1,1'-dimethylsilylene) (2,2'-isopropylidene)-bis(cyclopentadienyl) zirconium dichloride 100 ml of THF were added to 12.8 g (143 mmol) of cyclopentadienyl sodium at 0° C., and the mixture was stirred. After the solution had been cooled to −78° C., 50 ml of a solution of 17.3 ml (143 mmol) of 6,6-dimethylfulvene in THF was dropped to the solution. The reaction solution showed a deep orange color, and became slightly turbid. After having been stirred at room temperature for 3 hours, the reaction solution was hydrolyzed with 100 ml of water. After the solvent had been removed by distillation under reduced pressure, the remainder was separated with water and hexane, and the organic layer was dried with anhydrous magnesium sulfate. The solvent was removed by distillation, and the remainder was distilled under reduced pressure (30° C./10.6 Pa). As a result, 4.66 g of Compound (6) were obtained (in 18.9% yield).

In a 200-ml Schlenk flask replaced with nitrogen, 4.66 g (27.0 mmol) of Compound (6) were dissolved in 50 ml of THF, and the solution was stirred. After the solution had been cooled to −78° C., 19.8 ml (54.0 mmol) of n-butyllithium (2.73 mol/l) were dropped to the solution, and the mixture was stirred at room temperature overnight. After the mixture had been cooled to −78° C. again, a solution of 3.3 ml (27.0 mmol) of dichlorodimethylsilane in 21 ml of THF was dropped to the mixture over 30 minutes. After having been stirred at room temperature overnight, the reaction solution changed from an opaque one to a yellow one. The precipitate was removed by filtration, and the filtrate was concentrated. The resultant yellow oily matter was distilled under reduced pressure (35 to 45° C./7.98 Pa). As a result, 1.0 g of Compound (7) was obtained (in 16.2% yield).

In a 200-ml Schlenk flask replaced with nitrogen, 1.0 g (4.38 mmol) of Compound (7) was dissolved in 41 ml of hexane, and the solution was stirred. After the solution had been cooled to −78° C., 3.20 ml (8.76 mmol) of n-butyllithium (2.73 mol/l) were dropped to the solution, and the mixture was stirred at room temperature overnight. After the solvent of the opaque solution had been removed by distillation under reduced pressure, the precipitate was washed with 10 ml of hexane. The washed product was dried under reduced pressure. As a result, a dilithium salt [Compound (8)] as a white powder was obtained.

14 ml of toluene were added to Compound (8). A suspension of 1.02 g (4.38 mmol) of zirconium tetrachloride in 14 ml of toluene was dropped to the above suspension at −20° C. After the mixture had been stirred at room temperature overnight, the solvent was removed by distillation under reduced pressure. As a result, a target product [Compound (9)] was obtained. Compound (9) was extracted with 20 ml of dichloromethane, and the filtrate was concentrated. The concentrated product was washed with 10 ml of hexane, and was then dried under reduced pressure. As a result, 140 mg of Compound (9) were obtained (in 8.2% yield). The determination of the $^1$H-NMR of the compound provided the following results.

$^1$H-NMR (500 MHz, CDCl$_3$) δ: 0.45 [3H, s, (CH$_3$)$_2$Si], 0.91 [3H, s, (CH$_3$)$_2$Si], 1.43 [3H, s, (CH$_3$)C], 2.06 [3H, s, (CH$_3$)C], 6.06 (2H, m, —CH—), 6.44 (2H, m, —CH—), 6.72 (2H, m, —CH—).

Example 1

A stainless autoclave having an internal volume of 1 l was sufficiently dried and replaced with nitrogen. After that, 200 ml of 1-decene were charged into the autoclave, and the temperature of the mixture was increased to 60° C. After 0.5 mmol of methylaluminoxane (2.0-mmol/ml toluene solution; 0.25 ml) was loaded into the autoclave, loaded were 5 μmol of (1,1'-dimethylsilylene)(2,2'-dimethylsilylene)-bis(cyclopentadienyl) zirconium dichloride obtained in Production Example 1 (5-μmol/ml toluene solution; 1 ml). After that, hydrogen was immediately introduced into the autoclave to attain 0.05 MPaG, and polymerization was initiated.

120 minutes after that, 10 ml of methanol were added to the resultant so that the polymerization might be stopped. The contents were taken out and added to 200 ml of a 1-mol/l hydrochloric acid. Then, the mixture was stirred. The solution was transferred to a separating funnel, and the organic layer was fractionated. After that, the organic layer was washed with water, and the solid matter of the organic layer was removed with a filter paper 2C manufactured by Toyo Roshi Kaisha, Ltd. Heptane, the raw materials, methanol, and the like were removed by distillation from the resultant solution with a rotary evaporator (under a reduced pressure of about 1.0×10$^{-4}$ MPa in an oil bath at 100° C.). As a result, 88 g of a colorless, transparent liquid were obtained. Table 1 shows the results obtained by the above analysis methods.

Example 2

111 g of a colorless, transparent liquid were obtained in the same manner as in Example 1 except that the polymerization temperature was changed to 70° C. Table 1 shows the results obtained by the above analysis methods.

Example 3

61 g of a colorless, transparent liquid were obtained in the same manner as in Example 1 except that the polymerization temperature was changed to 50° C. Table 1 shows the results obtained by the above analysis methods.

Example 4

61 g of a colorless, transparent liquid were obtained in the same manner as in Example 1 except that 0.5 mmol of triisobutylaluminum and 0.01 mmol of N,N-dimethylanilinium tetrakis(pentafluorophenyl)borate were used instead of methylaluminoxane. Table 1 shows the results obtained by the above analysis methods.

Example 5

230 g of a colorless, transparent liquid were obtained in the same manner as in Example 4 except that 400 ml of 1-decene, 1.0 mmol of triisobutylaluminum, 0.02 mmol of N,N-dimethylanilinium tetrakis(pentafluorophenyl)borate, and 10 μmol of (1,1'-dimethylsilylene) (2,2'-dimethylsilylene)-bis(cyclopentadienyl) zirconium dichloride were used, the polymerization temperature was changed to 100° C., and the reaction time was changed to 240 minutes. Table 1 shows the results obtained by the above analysis methods.

Example 6

212 g of a colorless, transparent liquid were obtained in the same manner as in Example 5 except that the polymerization temperature was changed to 88° C. Table 1 shows the results obtained by the above analysis methods.

Example 7

90 g of a colorless, transparent liquid were obtained in the same manner as in Example 1 except that (1,1'-dimethylsilylene) (2,2'-isopropylidene)-bis(cyclopentadienyl) zirconium dichloride obtained in Production Example 2 was used instead of (1,1'-dimethylsilylene) (2,2'-dimethylsilylene)-bis(cyclopentadienyl) zirconium dichloride. Table 1 shows the results obtained by the above analysis methods.

Example 8

69 g of a colorless, transparent liquid were obtained in the same manner as in Example 7 except that the polymerization temperature was changed to 80° C. Table 1 shows the results obtained by the above analysis methods.

Example 9

81 g of a colorless, transparent liquid were obtained in the same manner as in Example 4 except that (1,1'-dimethylsilylene)(2,2'-isopropylidene)-bis(cyclopentadienyl) zirconium dichloride obtained in Production Example 2 was used instead of (1,1'-dimethylsilylene)(2,2'-dimethylsilylene)-bis(cyclopentadienyl) zirconium dichloride, and the polymerization temperature was changed to 80° C. Table 1 shows the results obtained by the above analysis methods.

Comparative Example 1

65 g of a colorless, transparent liquid were obtained in the same manner as in Example 1 except that bis(cyclopentadienyl)zirconium dichloride was used instead of (1,1'-dimethylsilylene)(2,2'-dimethylsilylene)-bis(cyclopentadienyl) zirconium dichloride. Table 2 shows the results obtained by the above analysis methods.

Comparative Example 2

103 g of a colorless, transparent liquid were obtained in the same manner as in Comparative Example 1 except that the polymerization temperature was changed to 50° C., and the usage of hydrogen was changed to 0.02 MPa. Table 2 shows the results obtained by the above analysis methods.

Comparative Example 3

40 g of a colorless, transparent liquid were obtained in the same manner as in Example 1 except that bis(pentamethylcyclopentadienyl)zirconium dichloride was used instead of (1,1'-dimethylsilylene) (2,2'-dimethylsilylene)-bis(cyclopentadienyl) zirconium dichloride. Table 2 shows the results obtained by the above analysis methods.

Comparative Example 4

96 g of a colorless, transparent liquid were obtained in the same manner as in Comparative Example 3 except that the polymerization temperature was changed to 50° C., and the usage of hydrogen was changed to 0.02 MPa. Table 2 shows the results obtained by the above analysis methods.

Comparative Example 5

43 g of a colorless, transparent liquid were obtained in the same manner as in Example 1 except that bis(n-butylcyclopentadienyl)zirconium dichloride was used instead of (1,1'-dimethylsilylene) (2,2'-dimethylsilylene)-bis(cyclopentadienyl) zirconium dichloride. Table 2 shows the results obtained by the above analysis methods.

Comparative Example 6

100 g of a colorless, transparent liquid were obtained in the same manner as in Example 1 except that rac(ethylidene)-bis(1-indenyl)zirconium dichloride was used instead of (1,1'-dimethylsilylene) (2,2'-dimethylsilylene)-bis(cyclopentadienyl) zirconium dichloride. Table 2 shows the results obtained by the above analysis methods.

Comparative Example 7

107 g of a colorless, transparent liquid were obtained in the same manner as in Example 1 except that (ethylidene)-bis(2-methyl-4-phenylindenyl)zirconium dichloride was used instead of (1,1'-dimethylsilylene) (2,2'-dimethylsilylene)-bis(cyclopentadienyl) zirconium dichloride, and the polymerization temperature was changed to 80° C. Table 2 shows the results obtained by the above analysis methods.

Comparative Example 8

38 g of a colorless, transparent liquid were obtained in the same manner as in Example 1 except that diphenylmethylidene-cyclopentadienylfluorenyl zirconium dichloride was used, the polymerization temperature was changed to 90° C., and the usage of hydrogen was changed to 0.8 MPa. Table 2 shows the results obtained by the above analysis methods.

Comparative Example 9

112 g of a colorless, transparent liquid were obtained in the same manner as in Example 1 except that (1,2'-dimethylsilylene)(2,1'-dimethylsilylene)-bis(indenyl)zirconium dichloride was used instead of (1,1'-dimethylsilylene)(2,2'-dimethylsilylene)-bis(cyclopentadienyl) zirconium dichloride, the polymerization temperature was changed to 70° C., and the usage of hydrogen was changed to 0.5 MPa. Table 2 shows the results obtained by the above analysis methods.

TABLE 1

| | | Example | | | | | | | | |
|---|---|---|---|---|---|---|---|---|---|---|
| | | 1 | 2 | 3 | 4 | 5 | 6 | 7 | 8 | 9 |
| Reaction conditions | Transition metal compound: kind | A | A | A | A | A | A | B | B | B |
| | Transition metal compound: usage (μmol) | 5 | 5 | 5 | 5 | 10 | 10 | 5 | 5 | 5 |
| | Co-catalyst | MAO | MAO | MAO | B1/TIBA | B1/TIBA | B1/TIBA | MAO | MAO | B1/TIBA |
| | Usage of 1-decene (ml) | 200 | 200 | 200 | 200 | 400 | 400 | 200 | 200 | 200 |
| | Usage of H$_2$ (MPaG) | 0.05 | 0.05 | 0.05 | 0.05 | 0.05 | 0.05 | 0.05 | 0.05 | 0.05 |
| | Temperature (° C.) | 60 | 70 | 50 | 60 | 100 | 88 | 60 | 80 | 90 |
| | Yield (g) | 88 | 111 | 61 | 61 | 230 | 212 | 90 | 69 | 81 |
| | Activity (kg/gZr) | 193 | 243 | 134 | 134 | 252 | 232 | 197 | 151 | 178 |
| | Kinematic viscosity at 100° C. (mm$^2$/s) | 56 | 33 | 118 | 624 | 49 | 115 | 153 | 42 | 96 |
| | Kinematic viscosity at 40° C. (mm$^2$/s) | 420 | 227 | 1,023 | 7,955 | 398 | 1,057 | 1,364 | 318 | 841 |
| | Viscosity index | 202 | 191 | 218 | 269 | 185 | 210 | 228 | 188 | 207 |
| | Pour point (° C.) | −47.5 | −55 | −40 | −25 | −45 | −40 | −45 | −47.5 | −40 |
| | Number-average molecular weight | 2,528 | 1,968 | 4,288 | 10,729 | 2,646 | 4,097 | 3,713 | 2,183 | 3,158 |
| | Weight-average molecular weight | 7,308 | 4,991 | 13,686 | 20,074 | 4,576 | 7,397 | 12,578 | 5,688 | 6,946 |
| | Molecular weight distribution: Mw/Mn | 2.89 | 2.54 | 3.19 | 1.87 | 1.73 | 1.81 | 3.39 | 2.61 | 2.20 |
| | Stereoregularity: mm (mol %) | 29 | 31 | 32 | 37 | 35 | 32 | 32 | 33 | 33 |
| | Stereoregularity: mr (mol %) | 47 | 39 | 40 | 32 | 36 | 38 | 37 | 37 | 47 |
| | Stereoregularity: rr (mol %) | 24 | 30 | 28 | 31 | 29 | 30 | 31 | 30 | 21 |

TABLE 2

| | | Comparative Example | | | | | | | | |
|---|---|---|---|---|---|---|---|---|---|---|
| | | 1 | 2 | 3 | 4 | 5 | 6 | 7 | 8 | 9 |
| Reaction conditions | Transition metal compound: kind | C | C | D | D | E | F | G | H | I |
| | Transition metal compound: usage (μmol) | 5 | 5 | 5 | 5 | 5 | 5 | 5 | 5 | 5 |
| | Co-catalyst | MAO | MAO | MAO | MAO | MAO | MAO | MAO | MAO | MAO |
| | Usage of 1-decene (ml) | 200 | 200 | 200 | 200 | 200 | 200 | 200 | 200 | 200 |
| | Usage of H$_2$ (MPaG) | 0.05 | 0.02 | 0.05 | 0.02 | 0.05 | 0.05 | 0.05 | 0.8 | 0.5 |
| | Temperature (° C.) | 60 | 50 | 60 | 50 | 60 | 60 | 80 | 90 | 70 |
| | Yield (g) | 65 | 103 | 40 | 96 | 43 | 100 | 107 | 38 | 112 |
| | Activity (kg/gZr) | 143 | 226 | 88 | 211 | 94 | 219 | 235 | 83 | 246 |
| | Kinematic viscosity at 100° C. (mm$^2$/s) | 8.4 | 24 | 17 | 30 | 35 | 499 | 522 | 557 | 185 |
| | Kinematic viscosity at 40° C. (mm$^2$/s) | 48 | 159 | 101 | 215 | 249 | 6,116 | 7,248 | 6,116 | 1,820 |
| | Viscosity index | 152 | 183 | 184 | 181 | 189 | 267 | 237 | 248 | 227 |
| | Pour point (° C.) | −50 | −52.5 | −50 | −55 | −50 | −16 | −15 | −25 | −30 |
| | Number-average molecular weight | 1,238 | 1,845 | 1,596 | 2,007 | 1,631 | 8,888 | 8,891 | 7,499 | 5,100 |

TABLE 2-continued

| | Comparative Example | | | | | | | | |
|---|---|---|---|---|---|---|---|---|---|
| | 1 | 2 | 3 | 4 | 5 | 6 | 7 | 8 | 9 |
| Weight-average molecular weight | 3,024 | 4,027 | 2,823 | 4,496 | 4,135 | 15,896 | 14,844 | 17,041 | 8,989 |
| Molecular weight distribution: Mw/Mn | 2.44 | 2.18 | 1.77 | 2.24 | 2.54 | 1.79 | 1.67 | 2.27 | 1.76 |
| Stereoregularity: mm (mol %) | 36 | 37 | 36 | 38 | 38 | 88 | 88 | 17 | 62 |
| Stereoregularity: mr (mol %) | — | — | — | — | — | — | — | 59 | — |
| Stereoregularity: rr (mol %) | — | — | — | — | — | — | — | 25 | — |

Items listed in Table 1 and Table 2 are described below.

[Transition Metal Compound]

A: (1,1'-dimethylsilylene)(2,2'-dimethylsilylene)-bis(cyclopentadienyl) zirconium dichloride
B: (1,1'-dimethylsilylene)(2,2'-isopropylidene)-bis(cyclopentadienyl) zirconium dichloride
C: bis(cyclopentadienyl)zirconium dichloride
D: bis(pentamethylcyclopentadienyl)zirconium dichloride
E: bis(n-butylcyclopentadienyl)zirconium dichloride
F: rac(ethylidene)-bis(1-indenyl)zirconium dichloride
G: (ethylidene)-bis(2-methyl-4-phenylindenyl)zirconium dichloride
H: diphenylmethylidene-cyclopentadienylfluorenyl zirconium dichloride
I: (1,2'-dimethylsilylene)(2,1'-dimethylsilylene)bis(indenyl) zirconium dichloride

[Co-Catalyst]

MAO: methylaluminoxane
B1: N,N-dimethylanilinium tetrakis(pentafluorophenyl)borate
TIBA: triisobutylaluminum As can be seen from Tables 1 and 2, polymers showing values for the stereoregularity mm similar to those of the polymers of the examples have been obtained in Comparative Examples 1 to 5 as well. However, as illustrated in Table 3 and FIG. 1, α-olefin polymers each having a kinematic viscosity preferred for use in a lubricating oil (a kinematic viscosity at 100° C. of 20 to 1,000 mm$^2$/s) can be freely produced by using the same transition metal compound and by changing the co-catalyst or adjusting the reaction temperature within a moderate range in Examples 1 to 6, but polymers each having a characteristic preferred for use in a lubricating oil are hardly obtained in Comparative Examples 1 to 5 when polymerization is performed in the same temperature range.

TABLE 3

| | Example | | | | | | Comparative Example | | | | |
|---|---|---|---|---|---|---|---|---|---|---|---|
| | 1 | 2 | 3 | 4 | 5 | 6 | 1 | 2 | 3 | 4 | 5 |
| Catalyst system | A/MAO | A/MAO | A/MAO | A/B1TIBA | A/B1TIBA | A/B1TIBA | C/MAO | C/MAO | D/MAO | D/MAO | E/MAO |
| Polymerization temperature (° C.) | 60 | 70 | 50 | 60 | 100 | 88 | 60 | 50 | 60 | 50 | 60 |
| Kinematic viscosity at 100° C. (mm$^2$/s) | 56 | 33 | 118 | 624 | 49 | 115 | 8.4 | 24 | 17 | 30 | 35 |

Figure 2:
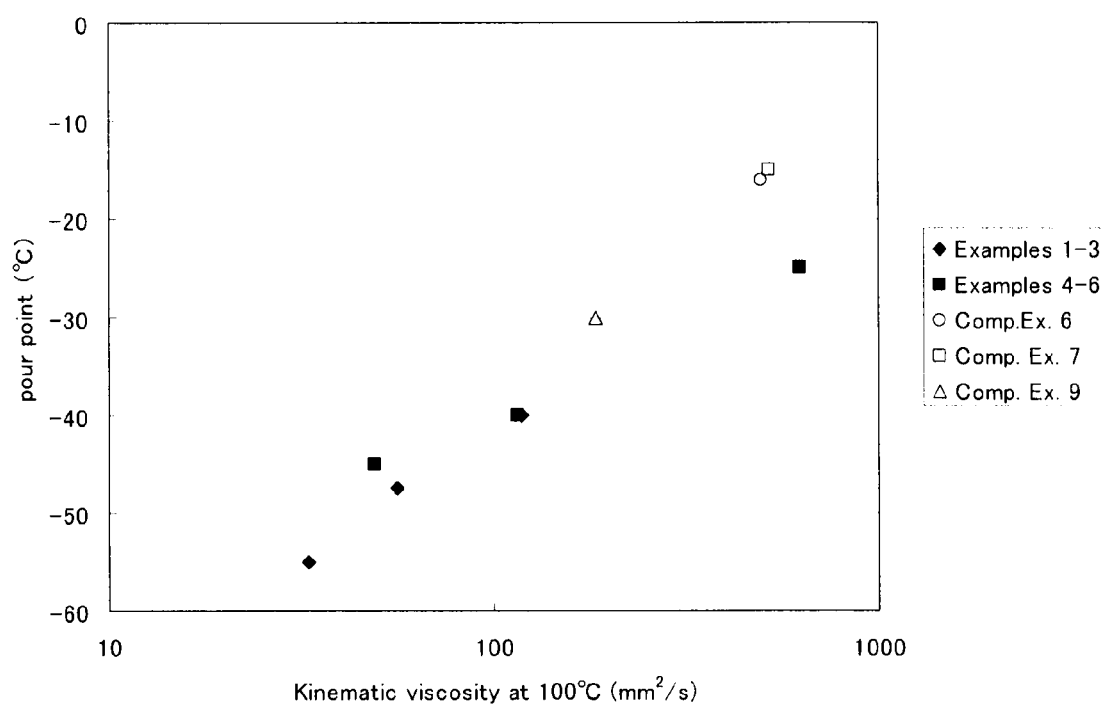
FIG. 2 It is a drawing showing a relation of a kinematic viscosity at 100° C. of an α-olefin polymer to a pour point of the α-olefin polymer.

As can be seen from Tables 1 and 2, the α-olefin polymers of Comparative Examples 6 to 9 each show a kinematic viscosity at 100° C. preferred for use in a lubricating oil. However, the catalytic activity is low in Comparative Example 8. In addition, the stereoregularity of each of the polymers obtained in Comparative Examples 6, 7, and 9 differs from that of any one of the examples. Accordingly, as illustrated in Table 4 and FIG. 2, the α-olefin polymer obtained in the invention of the subject application shows a low pour point as compared to the α-olefin polymer of a comparative example having the same kinematic viscosity as that of the α-olefin polymer obtained in the present invention. Accordingly, the α-olefin polymer obtained in the present invention has a nature more preferred for use in a lubricating oil.

TABLE 4

| | Example | | | | | | Comparative Example | | |
|---|---|---|---|---|---|---|---|---|---|
| | 1 | 2 | 3 | 4 | 5 | 6 | 6 | 7 | 9 |
| Catalyst system | A/MAO | A/MAO | A/MAO | A/B1TIBA | A/B1TIBA | A/B1TIBA | F/MAO | G/MAO | I/MAO |
| Kinematic viscosity at 100° C. (mm$^2$/s) | 56 | 33 | 118 | 624 | 49 | 115 | 499 | 522 | 185 |
| Pour point (° C.) | −47.5 | −55 | −40 | −25 | −45 | −40 | −16 | −15 | −30 |

Example 10

A stainless autoclave having an internal volume of 1 l was sufficiently dried and replaced with nitrogen. After that, 400 ml of 1-decene were charged into the autoclave. Next, 0.3 mmol of triisobutylaluminum was loaded into the autoclave, and the temperature of the mixture was increased to 105° C. 1.6 ml of a separately prepared catalyst mixed liquid [prepared by loading 0.20 mmol of triisobutylaluminum (0.5-mmol/ml toluene solution; 0.4 ml), 4 μmol of (1,1'-dimethylsilylene)(2,2'-dimethylsilylene)-bis(cyclopentadienyl) zirconium dichloride obtained in Production Example 1 (5-μmol/ml toluene solution; 0.8 ml), and 0.08 mmol (64 mg) of powdery N,N-dimethylanilinium tetrakis(pentafluorophenyl)borate into a 10-ml glass Schlenk bottle under a nitrogen atmosphere, stirring the mixture at room temperature for about 1 minute, adding 2 ml of 1-decene to the mixture, and stirring the resultant mixture at room temperature for an additional one hour] were charged into the autoclave. After that, 0.02 MPaG of hydrogen was introduced into the autoclave, and polymerization was initiated. 120 minutes after that, the remaining 1.6 ml of the catalyst mixed liquid were added to the resultant, and the mixture was subjected to a reaction at 105° C. for an additional 120 minutes. After that, 10 ml of methanol were added to the resultant so that the polymerization might be stopped. The contents were taken out and added to 200 ml of a 1-wt % aqueous solution of NaOH. Then, the mixture was stirred. The solution was transferred to a separating funnel, and the organic layer was fractionated. After that, the organic layer was washed with water, and the solid matter of the organic layer was removed with a filter paper 2C manufactured by Toyo Roshi Kaisha, Ltd. Toluene, the raw materials, methanol, and the like were removed by distillation from the resultant solution with a rotary evaporator (under a reduced pressure of about $1.0 \times 10^{-4}$ MPa in an oil bath at 100° C.). As a result, 275 g of a colorless, transparent liquid were obtained. Further, the liquid was distilled with a thin-film distilling device (a molecular distilling device Model MS-300 manufactured by Sibata Scientific Technology Ltd. and a high-vacuum exhausting device DS-212Z) under a reduced pressure of $5 \times 10^{-6}$ Pa at 180° C. As a result, 261 g of a polymerized product from which components having 20 or less carbon atoms had been removed were obtained. Table 5 shows the results obtained by the above analysis methods.

Example 11

The polymerized product obtained in Example 10 was loaded into a stainless autoclave having an internal volume of 1 l, and a stabilizing nickel catalyst (SN750 manufactured by Sakai Chemical Industry Co., Ltd.) was added to the polymerized product at a weight ratio of 1 wt %. After that, the polymerized product was subjected to a reaction in 2 MPa of hydrogen at 130° C. for 6 hours. After the completion of the reaction, the temperature of the contents was cooled to around 80° C., and then the contents were taken out. The catalyst component was separated by filtration with a 1-μm filter at 70° C. As a result, 260 g of a hydrogenated product were obtained. Table 5 shows the results obtained by the above analysis methods.

Example 12

230 g of a colorless, transparent polymerized product from which components having 24 or less carbon atoms had been removed were obtained in the same manner as in Example 10 except that 400 ml of 1-dodecene was used instead of 1-decene. Table 5 shows the results obtained by the above analysis methods.

Example 13

229 g of a hydrogenated polymerized product were obtained in the same manner as in Example 11 except that the polymerized product of Example 12 was used and the catalyst was changed to a palladium/alumina catalyst (product carrying 5% of Pd). Table 5 shows the results obtained by the above analysis methods.

Example 14

254 g of a colorless, transparent polymerized product from which components having 24 or less carbon atoms had been removed were obtained in the same manner as in Example 10 except that 400 ml of 1-octene was used instead of 1-decene. Table 5 shows the results obtained by the above analysis methods.

Example 15

252 g of a hydrogenated polymerized product were obtained in the same manner as in Example 13 except that the polymerized product of Example 14 was used. Table 5 shows the results obtained by the above analysis methods.

TABLE 5

|  |  | Example | | | | | |
|---|---|---|---|---|---|---|---|
|  |  | 10 | 11 | 12 | 13 | 14 | 15 |
| Reaction conditions | Transition metal compound: kind | A | — | A | — | A | — |
|  | Transition metal compound: usage (μmol) | 4 | — | 4 | — | 4 | — |
|  | Co-catalyst | B1/TIBA | — | B1/TIBA | — | B1/TIBA | — |
|  | Usage of 1-decene (ml) | 400 | — | — | — | — | — |
|  | Usage of 1-dodecene (ml) | — | — | 400 | — | — | — |
|  | Usage of 1-octene (ml) | — | — | — | — | 400 | — |
|  | Usage of $H_2$ (MPaG) | 0.05 | — | 0.05 | — | 0.05 | — |
|  | Temperature (° C.) | 105 | — | 105 | — | 105 | — |
|  | Yield (g) | 261 | 260 | 230 | 229 | 254 | 252 |
|  | Activity (kg/gZr) | 715 | — | 630 | — | 696 | — |
| Kinematic viscosity at 100° C. (mm²/s) | | 53 | 53 | — | 48 | — | 63 |

TABLE 5-continued

|  | Example | | | | | |
|---|---|---|---|---|---|---|
|  | 10 | 11 | 12 | 13 | 14 | 15 |
| Kinematic viscosity at 40° C. (mm²/s) | 440 | 444 | — | 381 | — | 621 |
| Viscosity index | 185 | 183 | — | 188 | — | 174 |
| Pour point (° C.) | −42.5 | −42.5 | — | −30 | — | −40 |

A: (1,1'-dimethylsilylene)(2,2'-dimethylsilylene)-bis(cyclopentadienyl)zirconium dichloride
B1: N,N-dimethylanilinium tetrakis(pentafluorophenyl)borate
TIBA: triisobutylaluminum

INDUSTRIAL APPLICABILITY

According to the present invention, an α-olefin polymer having a viscosity suitable for use in a lubricating oil can be produced on an industrial scale with ease, and contributes to improved fuel efficiency, reduced energy requirements, and a lengthened lifetime requested of the lubricating oil.

The invention claimed is:

1. A method of producing an α-olefin polymer, comprising:
polymerizing one or more α-olefins, each comprising 6 to 14 carbon atoms, with a catalyst obtained by combining components (A) and (B):
(A) a transition metal compound of formula (I):

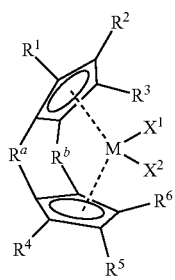

(I)

where
$R^1$ to $R^6$ each independently represent a hydrogen atom, or an alkyl group having 1 to 4 carbon atoms,
at least one selected from the group consisting of $R^1$ to $R^3$ represents a hydrogen atom,
at least one selected from the group consisting of $R^4$ to $R^6$ represents a hydrogen atom,
$R^a$ and $R^b$ each independently represent a divalent group for bonding two cyclopentadienyl rings selected from the group consisting of —$CR^7R^8$—, and —$SiR^7R^8$—,
$R^7$ and $R^8$ each independently represent a hydrogen atom, or an alkyl group having 1 to 4 carbon atoms,
$X^1$ and $X^2$ each independently represent a hydrogen atom, a halogen atom, a hydrocarbon group having 1 to 20 carbon atoms, or an organic group having 1 to 20 carbon atoms and comprising one or more atoms selected from the group consisting of a halogen atom, a silicon atom, an oxygen atom, a sulfur atom, a nitrogen atom, and a phosphorus atom, and
M represents a transition metal belonging to Group 4 of the periodic table; and
(B) at least one selected from the group consisting of (b-1) an organic aluminum oxy compound and (b-2) an ionic compound capable of reacting with the above transition metal compound to transform the compound into a cation;
wherein reaction conditions in the polymerizing comprise:
a hydrogen pressure of 0 to 0.2 MPa (G); and
a reaction temperature of 0 to 200° C.;
wherein the α-olefin polymer has a kinematic viscosity at 100° C. of 20 to 1,000 mm²/s;
wherein the α-olefin polymer is an α-olefin polymer whose α-olefin unit sequence portion has an isotacticity of 20 to 40% and a syndiotacticity of 40% or less in terms of triad expression.

2. The method of claim 1, wherein each of $R^1$ to $R^6$ in formula (I) represents a hydrogen atom.

3. The method of claim 1, wherein the polymerizing comprises polymerizing two or more α-olefins, each comprising 6 to 14 carbon atoms.

4. The method of claim 1, further comprising:
removing at least one α-olefin-comprising compound each having 24 or less carbon atoms after the polymerizing.

5. The method of claim 2, wherein the polymerizing comprises polymerizing two or more α-olefins, each comprising 6 to 14 carbon atoms.

6. The method of claim 1, comprising polymerizing one or more α-olefins, each comprising 8 to 12 carbon atoms.

7. The method of claim 1, wherein (A) the transition metal compound is at least one selected from the group consisting of (1,1'-dimethylsilylene)(2,2'-dimethylsilylene)-bis(cyclopentadienyl)zirconium dichloride and (1,1'-dimethylsilylene)(2,2'-isopropylidene)-bis(cyclopentadienyl)zirconium dichloride.

8. The method of claim 1, wherein the α-olefin polymer has a kinematic viscosity at 100° C. of 20 to 1,000 mm²/s, a viscosity index of 170 or more, and a pour point of -45° C. or less.

* * * * *